United States Patent [19]
Steinway et al.

[11] Patent Number: 5,339,080
[45] Date of Patent: Aug. 16, 1994

[54] EARTH-PENETRATING SYNTHETIC IMAGE RADAR

[75] Inventors: William J. Steinway, Maitland; James E. Thomas; Carl R. Barrett, both of Orlando, all of Fla.; Buddy G. Beck, Fairfax, Va.

[73] Assignee: Coleman Research Corporation, Fairfax, Va.

[21] Appl. No.: 43,715

[22] Filed: Apr. 8, 1993

[51] Int. Cl.$^5$ .................. G01S 13/08; G01S 13/90
[52] U.S. Cl. .......................... 342/22; 342/25; 342/129
[58] Field of Search ................ 342/25, 22, 129

[56] References Cited

U.S. PATENT DOCUMENTS

| | | | |
|---|---|---|---|
| 4,218,678 | 8/1980 | Fowler et al. | 367/37 X |
| 4,430,653 | 2/1984 | Coon et al. | 342/22 |
| 4,450,444 | 5/1984 | Wehner et al. | 342/196 X |
| 4,504,833 | 3/1985 | Fowler et al. | 367/37 X |
| 4,831,383 | 5/1989 | Ohnishi et al. | 342/22 |
| 4,839,654 | 6/1989 | Ito et al. | 342/22 |
| 4,851,848 | 7/1989 | Wehner | 342/25 |
| 4,905,008 | 2/1990 | Kawano et al. | 342/22 |
| 4,937,580 | 6/1990 | Wills | 342/22 |
| 5,012,248 | 4/1991 | Munro et al. | 342/22 |

*Primary Examiner*—John B. Sotomayor
*Attorney, Agent, or Firm*—Millen, White, Zelano & Branigan

[57] ABSTRACT

An earth-penetrating synthetic image radar system includes a frequency generator, a transmitter, a microprocessor-based timing and frequency controller, a reference receiver, a parallel polarized receiver, an orthogonal polarized receiver, a digitizer, a calibration processor, a position measurement reference, and an image processor. A plurality of frequency synthesizers are utilized within a single frequency generator to transmit a fast-stepped synthetic image containing a series of discrete frequencies. A switch is used to select between the outputs of the synthezisers for control of the transmitter's frequency output. With a first synthesizer of a frequency $f_1$ selected, a second synthesizer is being directed digitally to change to the next step in the frequency stepping sequence, frequency $f_2$. The synthesizers are switched into use by the frequency generator in a ping-pong manner; the first synthesizer handling all the odd-number frequencies, the second handling all even-number frequency selections.

3 Claims, 8 Drawing Sheets

EARTH-PENETRATING SYNTHETIC IMAGE RADAR

SUMMARY

Frequency-stepped radar imaging systems have been known since the 1940's and various transmitter, receiver, and image processing configurations have been developed in efforts to produce images of a subject area with improved depth and spatial resolution. Accurate imaging requires a minimization of several adverse effects which often occur in frequency-stepped radar systems, including the effects of slew in the transmitter output, production of undesireable harmonic frequencies by the transmitter, and spurious frequencies in the received signal.

One solution for minimizing such effects is described in U.S. Pat. No. 4,504,833 to Fowler et al., wherein there is disclosed a synthetic pulse radar imaging system in which a plurality of radio frequencies are transmitted substantially simultaneously by a stepped transmitter, are modulated by geophysical phenomena, and are received substantially simultaneously by a receiver. The resulting received signals are Fourier transformed to produce data upon which an image is based. While Fowler's disclosure provides an improved image due to extremely fast stepping of the transmitter through a series of frequencies, the presence of slew in the transmitter's RF output, as a result of the inherent inability of a frequency synthesizer to step instantaneously from a first frequency to a second frequency, results in transmission of a synthetic pulse rather than a series of discrete, stepped frequencies.

The synthetic pulse nature of Fowler's transmitted signal results in receipt by the receiver of spurious frequencies in addition to stepped frequencies. The presence of those spurious frequencies in the received signal is undesireable where digital Fast Fourier Transform techniques are to be used for processing the received signal because those techniques use sampling of the received signal only at the discrete stepped frequencies; other frequencies are unused and their presences may cause distortion in the resulting image.

Frequency synthesizers used in radar imaging systems of the prior art typically have a settling time when changing from one frequency to the next, whereby the synthesized signal momentarily oversteps the next frequency in the sequence before settling in to that frequency. This settling causes undesirable transient signal generation.

There is a need for a more accurate earth-penetrating radar imaging system useful for imaging of objects such as buried mines, buried ordnance, buried drums, buried, waste contaminants, subterranean geological features, etc. There is a further need for a radar imaging system which is capable of producing accurate 3-dimensional images in addition to 2-dimensional images. There is a further need for a radar imaging system which minimizes slew and settling effects in a transmitted signal. There is a further need for a radar imaging system which can take full advantage of modern Fast Fourier Transform techniques for signal processing of a received signal.

The present invention overcomes the limitations of the prior art by providing an earth-penetrating synthetic image radar system wherein a plurality of frequency synthesizers are utilized within a single frequency generator to transmit a fast-stepped synthetic image comprised of a series of discrete frequencies. A switch is used to select between the outputs of the synthezisers for control of the transmitter's frequency output. With a first synthesizer of a frequency $f_1$ selected, a second synthesizer is being directed digitally to change to the next step in the frequency stepping sequence, frequency $f_2$. The synthesizers are switched into use by the frequency generator in a ping-pong manner; the first synthesizer handling all the odd-number frequencies, the second handling all even-number frequency selections.

Selecting a synthesizer's output after settling has occurred minimizes undesireable transient signal generation. Also, the switch selecting process speeds up measurement time by minimizing receiver filter settling times and allowing the use of narrower filter bandwidths, which increase receiver sensitivity.

Even faster stepping, with minimized slew or transients in the transmitted signal, can be achieved by the use of three or more frequency synthesizers selected by a three-way switch or other appropriate switching means.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1A:
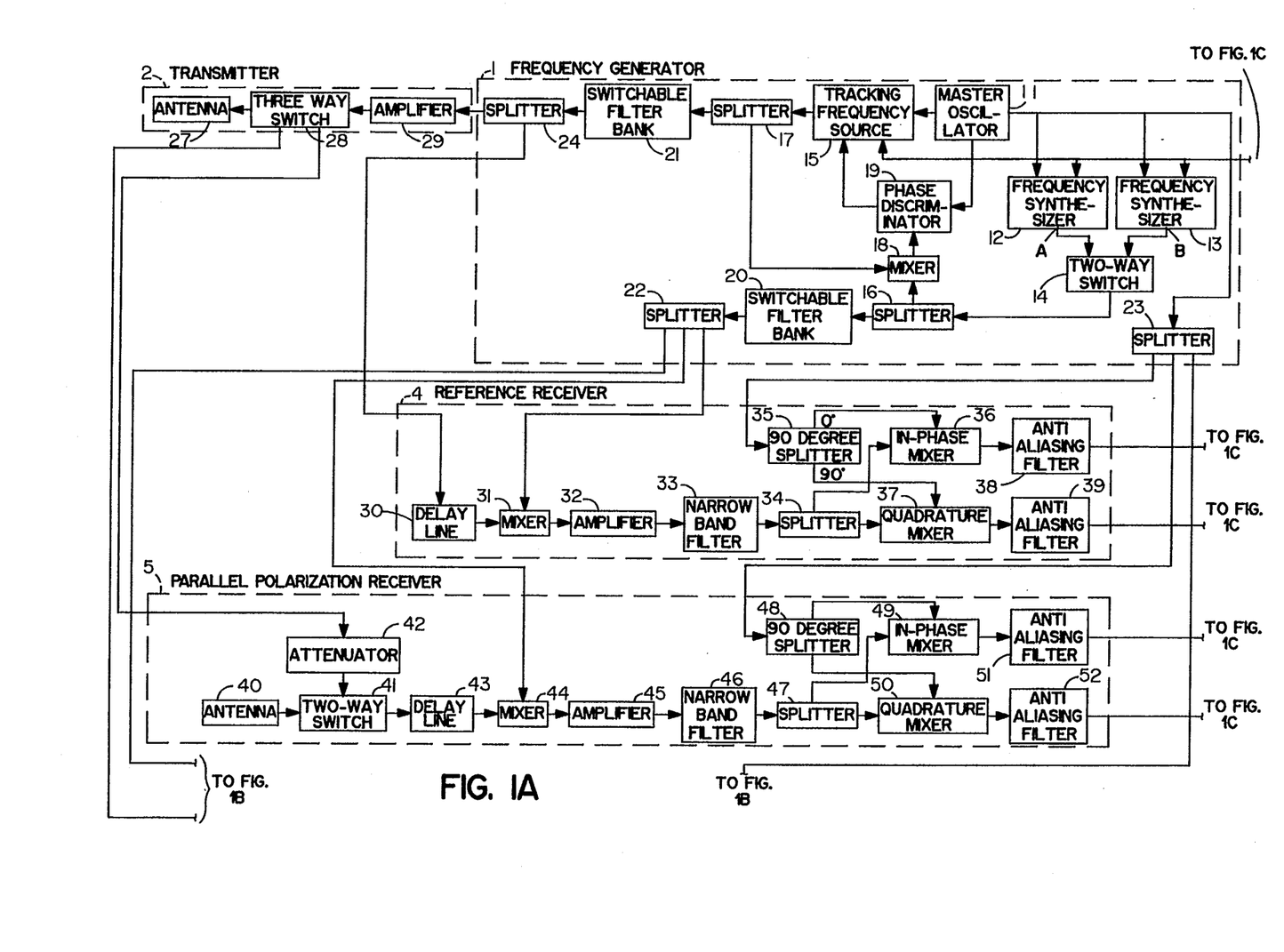
FIGS. 1A–1C and 2 illustrate the the principle elements of the invention according to a preferred embodiment.
Figure 1B:
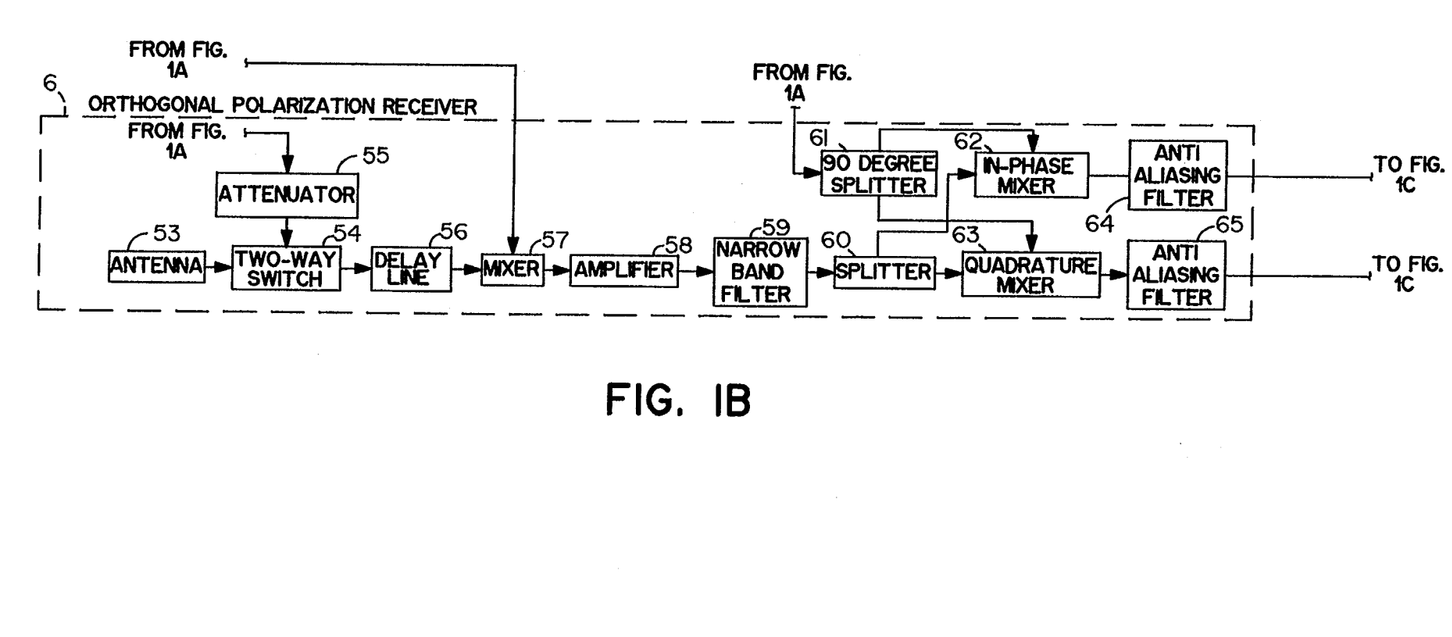
Figure 1C:
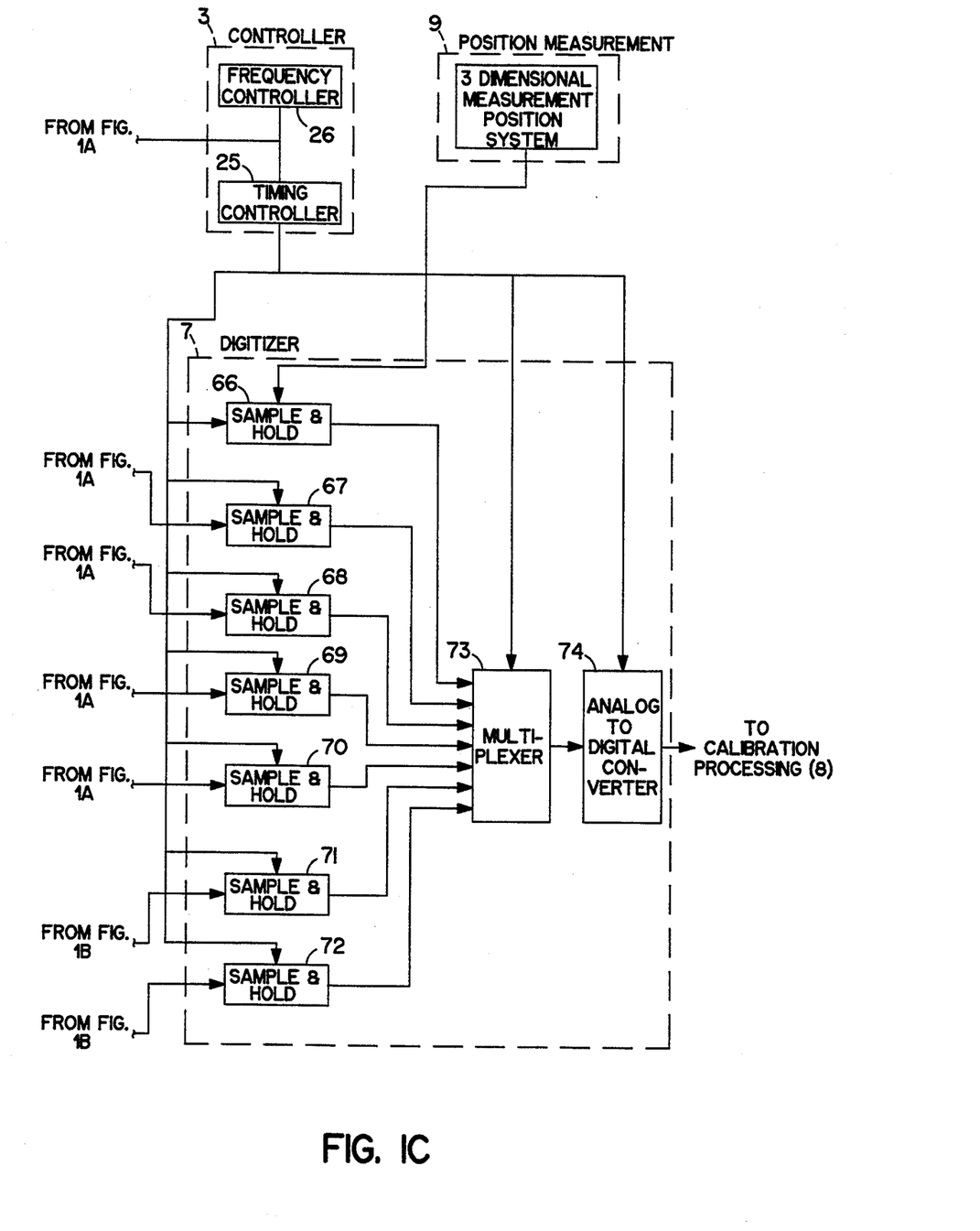
Figure 2:
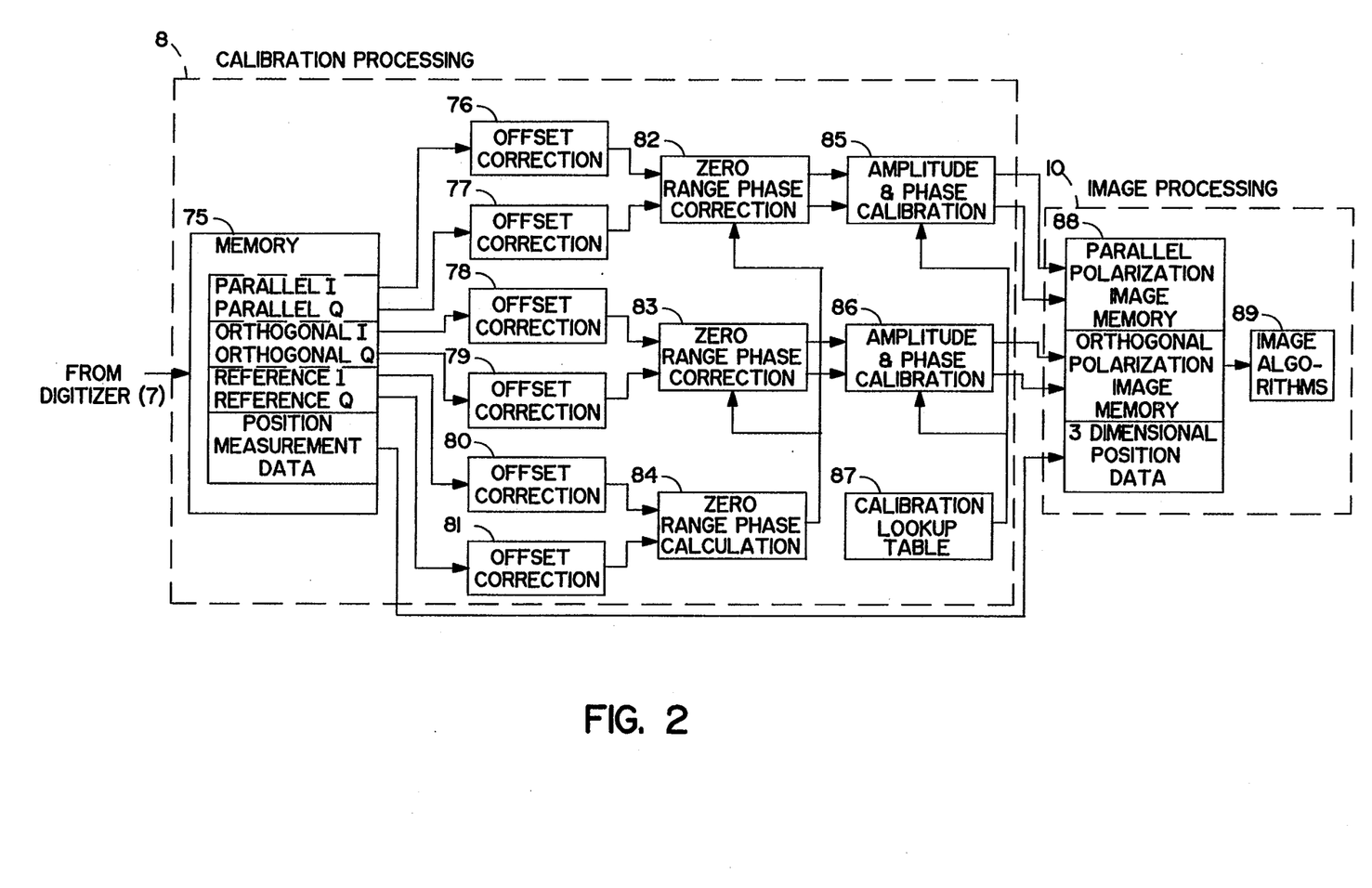

Referring to FIGS. 1A–1C and 2, the present invention according to a preferred embodiment is primarily comprised of a frequency generator 1, a transmitter 2, a microprocessor-based timing and frequency controller 3, a reference receiver 4, a parallel polarized receiver 5, an orthogonal polarized receiver 6, a digitizer 7, a calibration processor 8 (FIG. 2), a position measurement reference 9, and an image processor 10 (FIG. 2).

The frequency generator 1 is designed to produce a stepwise sequence of frequencies for transmission and a stepwise sequence of frequencies for use in the receivers. The transmitted frequencies differ from or are offset from the receiver frequencies by the master oscillator 11 frequency. The frequency generator 1 is designed to eliminate or minimize the generation of harmonics of the fundamental frequency that is generated. The frequency generator steps through a sequence of frequencies in equal increments or step sizes. The transmission frequency is phase coherent with the frequency used in the receivers.

Frequency synthesizers 12 ("frequency sythesizer A") and 13 ("frequency synthesizer B") generate the signal used as the local oscillator reference for the receivers. The frequency synthesizers 12 and 13 derive their signals from voltage controlled oscillators (VCOs) which are phase locked to the master oscillator 11. Both synthesizers are digitally controlled by microprocessor-based timing and frequency controller 3 for frequency selection and switch times. A switch 14 is used to select between synthesizers A or B. With synthesizer A selected, of a frequency $f_1$, synthesizer B is being directed digitally to change to the next step in the frequency stepping sequence, frequency $f_2$.

The synthesizers are switched in a ping-pong manner; the first synthesizer handling all the odd-number frequencies, the second handling all even-number frequency selections.

A fast lock-on tracking VCO 15 is preferably used for the transmitter signal generation, and locks onto the phase of the selected local oscillator (LO) signal from splitter 16 extremely fast so as to maintain a phase coherent signal transmission out of the transmitter antenna. Although the tracking VCO initially is driven to its selected frequency by a digital control 3, its final phase is controlled by the selected LO frequency in a phase lock loop. The phase lock loop is made up of components 16-19. The signal generated for transmission is offset from the signal generated for LO reference by the master oscillator frequency.

Frequency synthesizers normally generate the selected frequency and harmonics of the selected frequency, especially second and third harmonics. Switched filter banks 20 and 21 in both the LO frequency signal path and the transmitter signal path remove harmonics generated by the respective synthesizer oscillators. In the receiver downconversion process at mixers 31, 44, and 57, the harmonics would cause a phase error in the signal, which is undesirable. Removal of these harmonics is necessary to maintain the best possible phase coherent measurement data.

The filter banks 20 and 21 are made up of a number of bandpass filters with different center frequencies. The appropriate filter in the bank is selected depending on selected transmitter frequency or LO frequency.

The outputs of the frequency generator 1 include three master oscillator frequency outputs from splitter 23, three local oscillator frequency outputs from splitter 22, and two transmit frequency outputs from splitter 24. Splitters are radio frequency (RF) components generally equivalent to dividers, and they divide the signal into two or three paths.

The transmitter 2 is designed to linearly amplify the signal from the frequency generator 1. The output from the frequency generator is a stepwise sequence of frequencies typically covering a significantly large bandwidth depending upon application. The amplifier 29, three-way switch 28, and the antenna 27 must be able to pass the frequencies with minimum internal loss. The actual amplifier gain depends on application, but gain should preferably be flat versus frequency, and group phase delay should be minimum versus frequency. The antenna 27 should be designed to have a minimum mismatch versus frequency.

Specific examples of antennas include an equiangular spiral for near-ground surface applications and log periodic dipole arrays for airborne applications. Such antennas are standard designs and are commercially available.

The reference receiver 4 is designed to extract the amplitude and phase of the transmit signal from the frequency generator 1. The processing to accomplish the task includes a downconversion of the frequency generator signal to obtain a constant intermediate frequency (IF), filtering, and an in-phase and quadrature downconversion to baseband followed by a low-pass, anti-aliasing filter. The signal then goes to the digitizing circuitry, discussed below.

The signal from the frequency generator at the splitter 24 is delayed in a coaxial delay line 30, which produces a linear phase shift versus increasing frequency step. The first downconversion in mixer 31 downconverts the delay line signal using the LO signal from splitter 22 to produce the IF signal. This signal is the same frequency as the master oscillator frequency, no matter what transmit frequency or LO frequency step is selected. The phase of the IF signal will vary with respect to the master oscillator frequency phase versus step sequence because of the delay line 30, the phase lock-on with the frequency synthesizers 12 and 13, and the tracking frequency source phase locking loop.

The IF signal is then amplified by amplifier 32 and filtered by an extremely narrow-band filter 33 in the receiver channel to remove spurious signals generated by the frequency synthesizers 12 and 13. Frequency synthesizers normally generate spurious signals which are related to the mixings of the minimum step size of the frequency synthesizer with a selected center frequency. Spurs are generated at $f_o \pm \Delta f/2$, $f_o \pm \Delta f$, $f_o \pm 3\Delta f/2$, etc., where $\Delta f$ is the minimum step size, and $f_o$ is the center frequency. Harmonics generated by the synthesizer also have these spurs, but the harmonics are removed by the switched filter banks 20 and 21 in the present invention.

After the first downconversion in the receiver, the IF frequency has the remaining spurs which are at $f_{IF} \pm \Delta f/2$, $f_{IF} \pm \Delta f$, ..., etc., where $f_{IF}$ is the receiver intermediate frequency. These are removed by filter 33 with $f_{IF}$ center frequency and bandwidth $<< \pm \Delta f/2$.

A second downconversion uses the master oscillator 11 signal as the local oscillator input to the in-phase and quadrature detection mixers. The master oscillator signal is split at 90-degree splitter 35 which outputs the signal with a 0-degree phase shift and a 90-degree phase shift for use in mixers 36 and 37.

These in-phase and quadrature signals are the complex vector values representing the reference signal; the amplitude and phase of the reference signal at any frequency of the stepping sequence is given by:

$$\text{Amplitude}(@f_i) = \sqrt{(\text{In-Phase}(@f_i))^2 + (\text{Quadrature}(@f_i))}$$

$$\text{Phase}(@f_i) = \arctan\left[\frac{\text{Quadrature}(@f_i)}{\text{In-Phase}(@f_o)}\right]$$

where i is an integer representing a frequency in the step sequence.

The anti-aliasing filters 38 and 39 prevent an aliasing spectrum from being created during the digitizing process by removing frequencies exceeding one-half of the sampling rate of the A/D converter. This filtering is a standard practice and dictated by the Nyquist criterion. The in-phase and quadrature components are then sent to the digitizer circuit 7.

Using the above-described preferred embodiment for the reference receiver, as the frequency stepping sequence is generated, the amplitude and phase of the transmitted signal at the splitter 24 is measured by the reference receiver 4.

The transmission signal from antenna 27 is received by transmission signal receivers 5 and 6, which receive parallel and orthogonal signals, respectively. Parallel polarization receiver 5 is designed to extract the amplitude and phase of the parallel polarized signal returned from geophysical phenomena and/or buried objects via antenna 40.

The parallel polarization is defined as that polarization which is the same as or parallels the transmitted polarization. If the transmitted polarization is right hand circular (RHC), the parallel polarization is RHC and the orthogonal polarization is left hand circular (LHC). If the parallel polarization is vertical (V), the orthogonal polarization is horizontal (H).

The orthogonal polarization receiver 6 is designed to extract the amplitude and phase of the orthogonal polarized signal returned from geophysical phenomena and/or buried objects via antenna 53.

Both receivers operate substantially identically with the exception of the antennas. The antenna 40 for the parallel polarization receiver must be able to receive a signal that has the same polarization as the transmit signal. The antenna 53 for the orthogonal polarization receiver must be able to receive a signal that has the polarization orthogonal to the transmit signal.

In receivers 5 and 6, after the antenna receives the signal, there is a two-way switch which allows either the signal received by the antenna or an attenuated transmitter signal to be selected. In a normal operating mode, the signal from the antenna is selected. The alternate switch selection is for calibration and is explained in the calibration processing description, below.

The input signal from the switch 41 or 54 is delayed in a coaxial delay line 43 or 56, respectively, which produces a linear phase shift versus increasing frequency step. The first downconversion in mixer 44 or 57 downconverts the delay line signal using the LO signal from splitter 22 to produce the IF signal. This signal is the same frequency as the master oscillator frequency 11, no matter what transmit frequency or LO frequency step is selected. The amplitude and phase of the IF will vary with respect to the master oscillator frequency versus step sequence because of the delay line, phase lock-on with the frequency synthesizers, the tracking frequency source phase locking loop, and the geophysical phenomena and/or buried objects.

The IF signal is amplified by amplifier 45 or 58 and filtered by narrow-band filter 46 or 59.

Spurious signals generated by the frequency synthesizers are removed by this extremely narrow-band filter in the receiver channel. Frequency synthesizers normally generate spurious signals which are related to the mixings of the minimum step size of the frequency synthesizer with the selected center frequency. Spurs are generated at $f_o \pm \Delta f/2$, $f_o \pm \Delta f$, $f_o \pm 3\Delta f/2$, etc. Where $\Delta f$ is the minimum step size, and $f_o$ is the center frequency.

The harmonics generated by the synthesizer also have these spurs, but these are removed by the switched filter banks 20 and 21.

After the first downconversion in the receiver, the IF frequency has the remaining spurs which are at $f_{IF} \pm \Delta f/2$, $f_{IF} \pm \Delta f$, ..., etc. Where $f_{IF}$ is the receiver intermediate frequency. These are removed by filter 46 and 59 with $f_{q2}$ center frequency and bandwidth $<< \pm \Delta f/2$.

The second downconversion uses the master oscillator signal as the local oscillator input to the in-phase and quadrature detection mixers. The master oscillator signal is split at 90-degree splitters 48 and 61 which output the signal with a 0-degree phase shift and a 90-degree phase shift for use in mixers 49/50 and 62/63.

These in-phase and quadrature signals are the complex vector values representing the received signal; the amplitude and phase of the signal at any frequency of the stepping sequence is given by:

$$\text{Amplitude}(@f_i) = \sqrt{(\text{In-Phase}(@f_i))^2 + (\text{Quadrature}(@f_i))}$$

$$\text{Phase}(@f_i) = \arctan\left[\frac{\text{Quadrature}(@f_i)}{\text{In-Phase}(@f_o)}\right]$$

where i is an integer representing a frequency in the step sequence.

The anti-aliasing filters 51, 52, 64, and 65 prevent an aliasing spectrum from being created during the digitizing process by removing frequencies exceeding one-half of the sampling rate of the A/D converter. This filtering is a standard practice and is dictated by the Nyquist criterion. The in-phase and quadrature components are then sent to the digitizer circuit 7.

Using the design of the preferred embodiment as described above, as the frequency stepping sequence is generated, the amplitude and phase of the return signal at the antenna 40 or 53 is measured by the receiver.

The digitizer section 7 simultaneously samples seven analog data channels using sample-and-holds 66–72 and then multiplexes at multiplexer 73 this data to the analog-to-digital converter (ADC) 74 for conversion to an equivalent binary value. The sampling strobe, the data selection strobe, and the start of conversion strobe are provided via the timing controller 3.

The sample and holds (S/H) 66–72 are designed to sample an analog waveform and then hold this value until the appropriate time for analog-to-digital conversion. The sample and holds' specifications should meet the full-scale linear input range, acquisition time, droop rate, and transient settling time that ensure the digitized data to be a true representation of the actual data.

The multiplexer 73 is an electrically controlled switch that selects the desired sample and hold channel of data to be passed on to the analog-to-digital converter.

The analog-to-digital converter is a device which converts the analog signal to the equivalent binary value. The converter's accuracy and nonlinearities should not contribute more than one least significant bit of error in order for the system's dynamic range not to be affected.

For example, for an input voltage of $+/-10$ volts and a 16-bit ADC, the resolution of one binary bit has a value of 305 $\mu V$. If one sample is taken every 5 $\mu s$ by the ADC, and seven channels must be sampled, the last sample is taken after 35 μs has passed. For no significant errors to occur, the droop of the S/H should not exceed 2.5 μs, and the transient settling time should be no greater than 0.5 μs.

The controller section 3 is designed to provide the necessary timing strobes and the frequency selection values for the system.

The frequency selection section 26 is designed to output a digital control signal frequency step size. The frequency controller signal for a given frequency is strobed by the timing controller 25 into frequency synthesizer A and/or B, in a ping-pong manner. All even frequencies are strobed into synthesizer A and all odd frequencies are strobed into synthesizer B. The frequency value is also strobed into the tracking frequency source.

The timing controller section 25 provides the timing for strobing and frequency words into the synthesizers, strobing the sample and hold, multiplex strobing the data to the analog-to-digital converter. The timing controller also switches the switchable filter banks 21 and 20, depending on which frequency value is being transmitted.

The position measurement subsystem 9 is not part of the radar system itself, but position data is required for the operation of the imaging algorithms. The position of each measurement set must be known and recorded along with the data. Position should be known in 3 dimensions with an accuracy of one-tenth of a wavelength for the highest frequency of the stepping sequence. If the highest frequency is 1000 MHz, the wavelength is approximately 13 inches and position accuracy must be at least 1.3 inches.

The calibration processor 8 removes biases or offset's in the signals, phase corrects the receiver signals to align with the transmitter phase at each frequency in the stepping sequence, and removes amplitude and phase errors due to nonlinearities in the components.

A unique method is employed for bias or offset removal at offset corrections 76–81 due to nonlinearities or component drift in the system. The method makes use of an RF delay line 30 in the reference channel and in the receiver channels 43 and 56. These create a known linear phase shift versus frequency, which results in a sine wave function versus frequency to appear in the in-phase signal at mixers 36, 49, and 62, and in the quadrature-phase signal at mixers 37, 50, and 63 of the receiver and reference channels. The average value of a sine wave is "zero" therefore a non-zero average must be removed. The in-phase and quadrature-phase data is averaged over the entire number of frequencies stepped through, and that average is subtracted from the data at offset corrections 76–81. This operation is done each time a set of frequencies is completed since drift and biases of components can change with time, temperature, or signal conditions.

The in-phase and quadrature-phase signals output from the parallel and orthogonal receivers 5 and 6 are phase corrected with a signal derived by measurement of the reference phase of the transmit signal itself.

When frequency synthesizers 12 and 13 switch from one frequency to another, the mechanisms internal to the synthesizers derive their reference for the new frequency from a master oscillator. The phase of the master oscillator with respect to the final synthesizer frequency phase is not known, not necessarily repeatable, and is not the same phase for all frequencies.

In order for the receiver signal phase at each frequency to have the same starting phase, the transmit signal phase is measured at each frequency and the receiver signal phase is corrected so that all received signal phases across all frequencies are aligned to the same starting phase reference point.

This phase correction is computed in zero range calculation 84 and the correction made to the parallel and orthogonal receiver signals in zero range phase corrections 82 and 83 respectively.

Nonlinearities in the RF components and A/D converters are corrected for in both amplitude and phase by a unique calibration method 85 and 86.

The switches 28, 41, and 54 are placed into a "calibrate" position such that the transmitter signal is attenuated at attenuators 42 and 55 and fed directly into the receiver, bypassing the antennas. Data is collected immediately after the reference channel phase correcting operation for all frequencies. In theory, this data should have a linear phase shift versus selected frequencies and a uniform amplitude over all frequencies. This, in general, will not be true due to component inaccuracies. Thus, a calibration of amplitude and phase is created versus frequency 87, and applied to the data after reference phase correction at 85 and 86. The amplitude and phase corrections are calculated to cause the amplitude to become flat and the phase to become linear when the switches 28, 41, and 54 are in the calibrate position.

The data is then stored into memory as in-phase (I) and quadrature (Q) pairs for each frequency of the stepping sequence and both parallel and orthogonal receivers. With each complete set of data is a measurement position. The data is then gathered over the surface area to be imaged.

Image formation is accomplished by phase correcting all signals, at all frequencies, from all measurement points (spatial) for the phase to the image point. The velocity of propagation in the propagation media and the distance from the measurement point to the image point determines the image point phase correction. The signal amplitudes are summed from all frequencies, at all measurement points once the image point phase correction is made. This summation is the amplitude at this single image point. Each image point requires a different phase correction across all frequencies and measurement points. The following discusses the image formation in detail.

In its preferred embodiment, the invention accomplishes its signal processing in software-controlled, general-purpose, commercially available high-speed computational equipment. However, other conventional signal processing means, for example hardware or firmware based signal processors, may be employed without detracting from the spirit and scope of the invention. The invention may also be employed for generating data supplied to other portions of a total observation system (e.g., as a part of a data fusion process which uses otherwise incomplete data from each sensor of a set of sensors and fuses the results to complete the observation requirements).

The data imaging process makes use of the parallel and orthogonal polarization digitized data at 88 that has been phase and amplitude corrected in the manner described and applies an image processing algorithm 89, described below.

Figure 3:
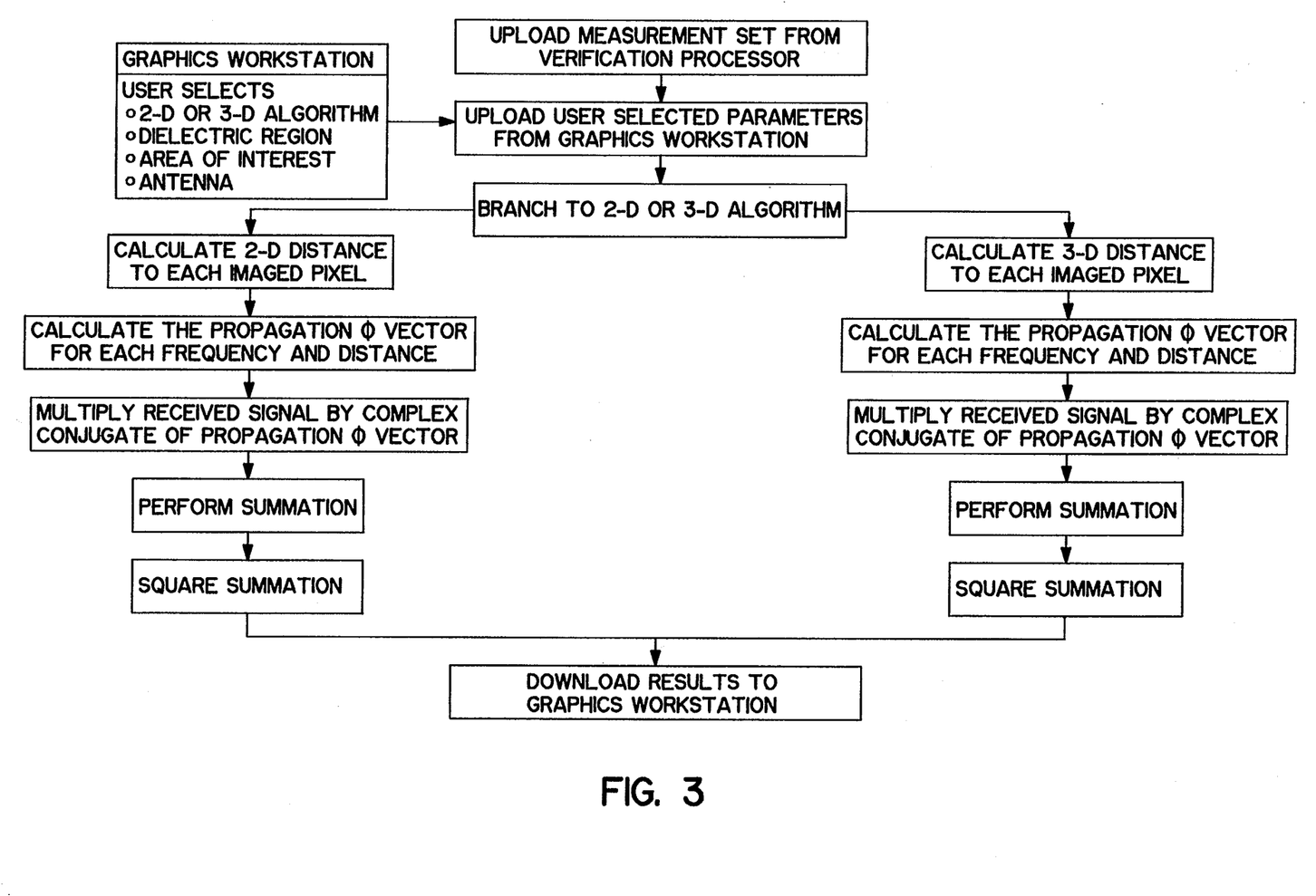
FIG. 3 illustrates the 2- and 3-dimensional image processing functions according to a preferred embodiment of the invention.

FIG. 3 illustrates the 2- and 3-D image processing functions. These functions include the algorithms which form the desired images in a format that can be used by an operator or by additional elements of a site characterization system. As shown in the figure, operations include downloading of processing parameters to the image processor. Processing parameters include 2- or 3-D algorithm, dielectric regions (e.g., based upon apriori knowledge or operator supplied guess), parallel or orthogonal polarized data usage and spatial areas of particular interest. The image processor performs the specified 2- or 3-D algorithm set. The algorithms are functionally the same, but the 3-D algorithm operates in 3-D space while the 2-D algorithm operates in 2-D space.

Figure 4A:
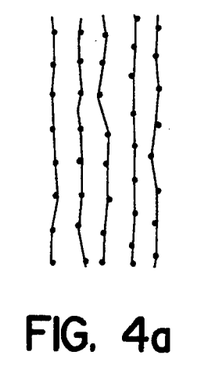
FIGS. 4a and 4b illustrate steps that are completed in the image processing sequence according to a preferred embodiment of the invention.
Figure 4B:
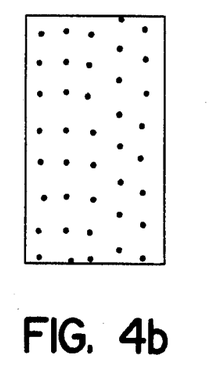
Figure 5:
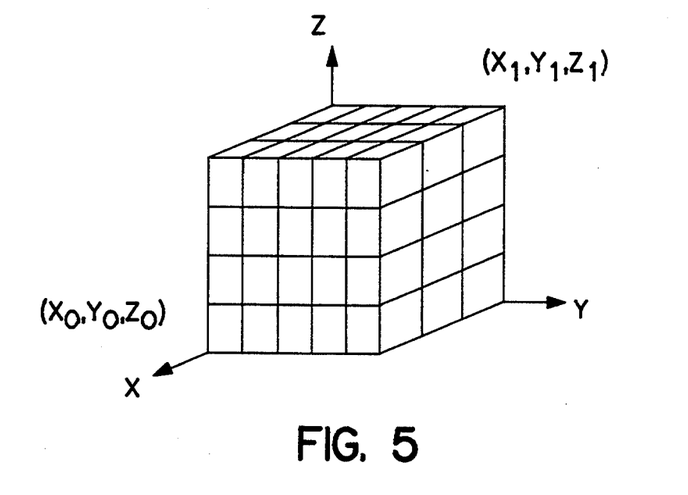
FIG. 5 illustrates the coordinate system used to describe a region that will be imaged by the radar system of the present invention.
Figure 6:
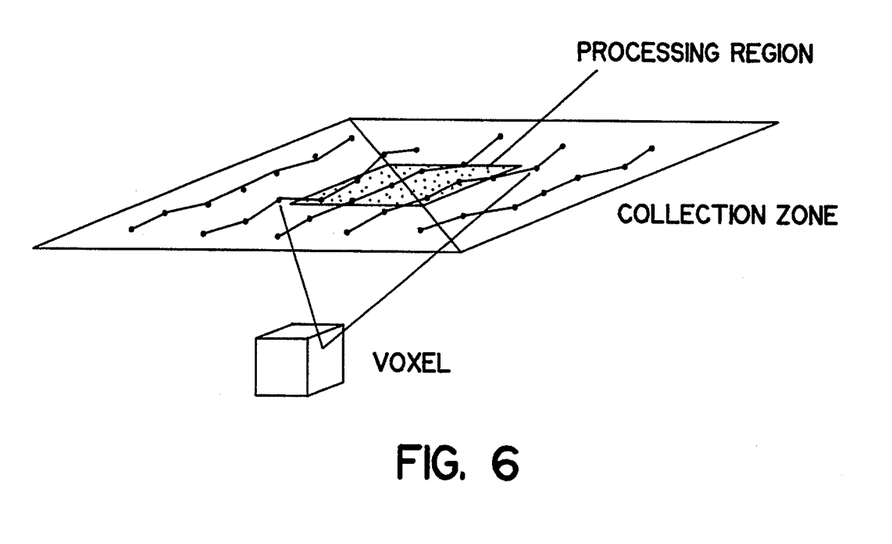
FIG. 6 illustrates the concept of image processing according to a preferred embodiment of the invention.

FIGS. 4 through 6 illustrate steps that are completed in the image processing sequence. As illustrated in FIG. 4a, the radar is moved over the surface to be imaged in as accurate a raster scan format as possible and data is collected at discrete points. The verification process described above is performed such that calibrated data is collected and stored for later processing and image formation. This survey dictates the following data storage requirements:

A grid of discrete locations is stored ($N_{row} \times N_{col}$) for the total area.

A number of frequencies are transmitted ($N_f$) at each of the locations.

Calibrated parallel and orthogonal polarized returns are received for each frequency.

An I&Q value is obtained for each return.

This produces $4 \times N_{row} \times N_{col} \times N_f$ values for the $N_{row} \times N_{col}$ radar sample (survey) positions.

As illustrated in FIG. 4b, a complete set of data from a region on the surface (defined as the "collection zone") contains measurement data from discrete locations. After the operator has designated a particular spatial volume that he wishes to image, the complete set of data is partitioned to define the "processing region" of raw data points that will be used for image construction.

FIG. 5 illustrates the coordinate system used to describe the region that will be imaged while FIG. 6 illustrates the concept of the image processing.

The response of point source objects at locations in any volume of space beneath the surface can be estimated by the proper combination of received energy at the surface. As shown in FIG. 5., using defined input parameters, a volume of space beneath the surface is specified by defining opposite corners ($x_o$, $y_o$, $z_o$) to ($x_1$, $y_1$, $z_1$), with increments x,y, z between verticies. This defines the volume that will be imaged by the imaging process.

FIG. 6 illustrates the relationship of the surface area to the imaged volume element (voxel). A "processing region" that is a subset of the "collection region" is specified via declaration of parameters. The specification of this area and of the frequency extent (including upper and lower band edges) that is to be processed in forming the image, the useful processing region as limited by the radar beamwidth and the physical properties of the soil (e.g., dielectric constant and loss tangent) collectively define the resolution that is achievable by the radar system of the present invention.

Figure 7:
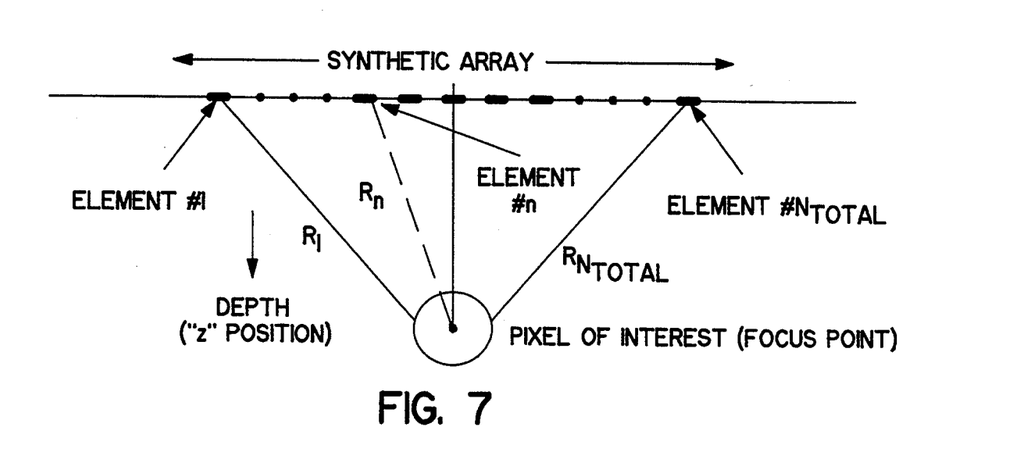
FIG. 7 illustrates a 2-dimensional imaging algorithm according to an embodiment of the present invention.

The 2-D imaging process is similar to the 3-D imaging process, discussed above, except that the data used to construct the image is taken from a single survey line over the pixel that is to be examined. That is, the survey positions used for image formation are taken from those survey positions that are effectively in a single vertical plane that includes the pixel being examined. FIG. 7 illustrates this process. As shown in the figure, the intent is to generate a synthetic array that is focused on each imaged pixel.

The 2-D imaging process requires the calculation of the slant range $R_{11}$ from each imaged pixel, $P(x,z)$, to each array element. At each radar frequency and $R_{11}$ the propagation phase (n, f) is calculated. This method of inserting the phase for each propagation ray represents a signficant uniqueness of the present invention. Since this calculated phase is dependent on the wavelength and effective propagation distance between the array element and the imaged pixel, the stepped frequency approach allows the incorporation of factors resulting from 1) nonlinear propagation paths created by bending of the propagation ray as it crosses multiple dielectric junctions, and 2) the effects of deviations of the wavelength in each dielectric segment through which the propagation ray passes.

It also permits the inclusion of frequency dispersion factors that may characterize the real lossy dielectric. For example, the true propagation distance, $R_{11}$, is generally composed of a number of incremental segments, $\Delta R(i)$, where the ith segment has associated with it at the fth frequency the complex dielectric constant:

$$\epsilon_c(i,f) = \epsilon_r(i,f) + j\epsilon_i(i,f).$$

The true propagation phase, $f(n,f)$, is then the summation of the propagation phases over the set of dielectric regions that form the propagation path. That is, with the wavelength, $\lambda(i,f)$, given as $$\lambda(i,f) = \frac{\text{Velocity of Light}}{f \sqrt{\epsilon_r(i,f)}},$$

the propagation phase becomes $$\phi(n,f) = 2\pi \sum_{i=1}^{I} \frac{\Delta R(i,f)}{\lambda(i,f)}$$

where the summation is over all the segments which form the propagation path.

This phase defines the unit propagation vector as $e^{j(n,f)}$. The correct operation to cause the desired coherent addition of energy received at all array locations from the imaged pixel is to remove this propagation phase angle from the respective received signals. This is accomplished by multiplying the received signal at each array element and frequency, $s_i(n,f)$, by the complex conjugate of the propagation vector as in $$s_o(n,f) = s_i(n,f)\, e^{-j(n,f)}.$$

The algorithm is completed by performing the summation of $s_o(n,f)$ over all array elements and selected frequency samples to form the complex pixel response, $R(x,z)$, as in $$R(x,z) = \sum_{1}^{N_f} \sum_{1}^{N_{Total}} s_o(n,f).$$

Figure 8:
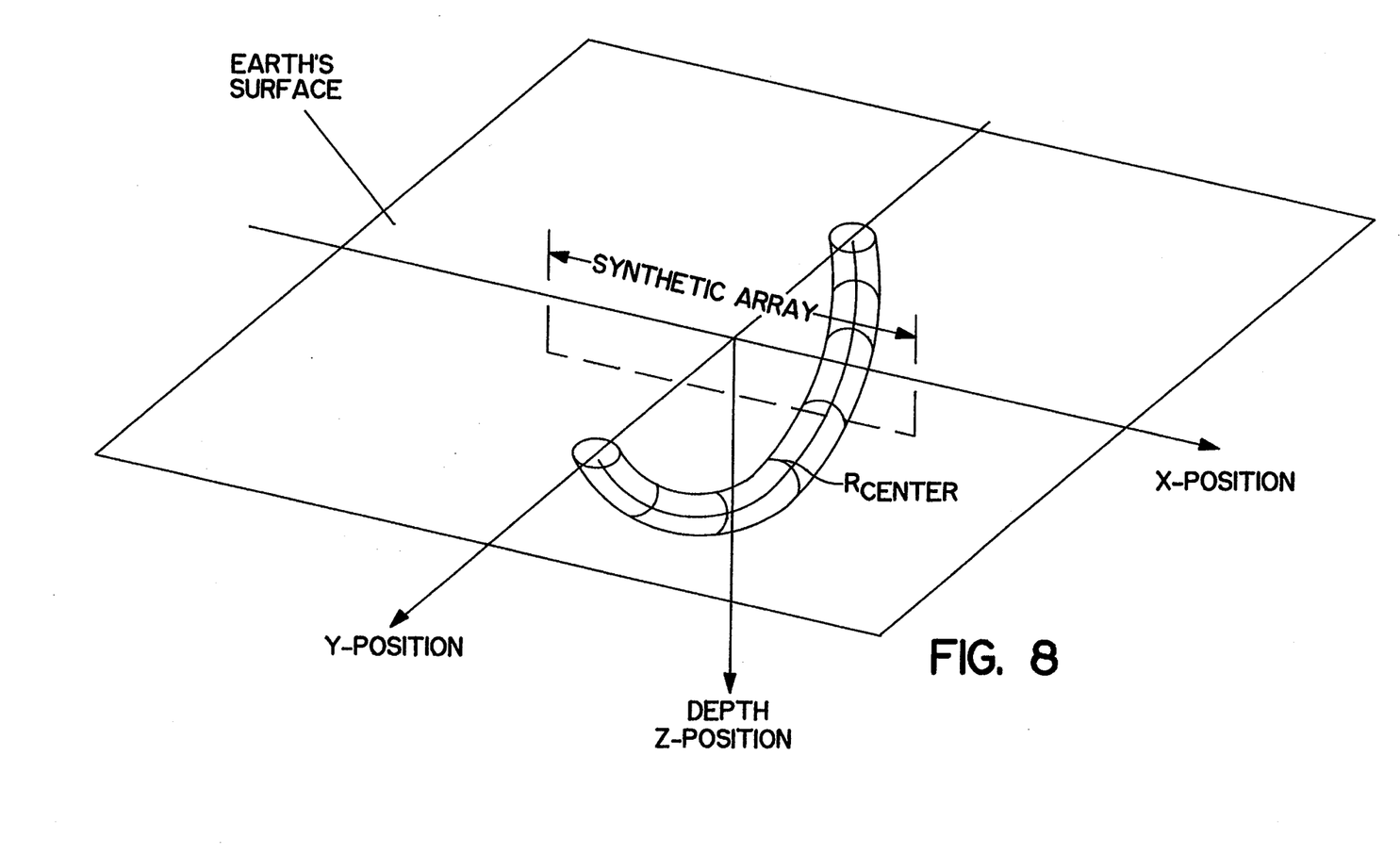
FIGS. 8 and 9 illustrate 2-dimensional and 3-dimensional imaging algorithms according to the present invention.

By envelope (or square law) detection of this result the 2-D pixel response is obtained. This process produces the 2-D ambiguity surface as illustrated in FIG. 8 (when losses and radar beamwidth are ignored). The significance of the ambiguity surface is that objects located anywhere within the toroidal shape will be included in the image response.

Figure 9:
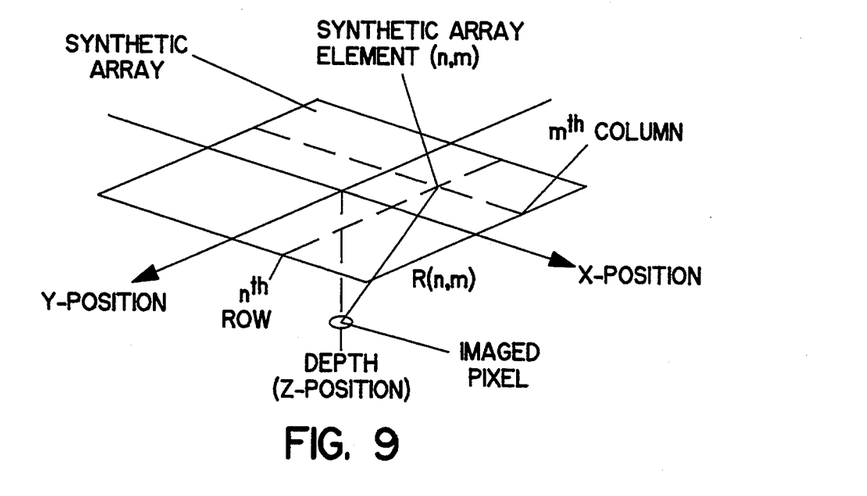

The 3-D algorithm can be explained as a simple modification to the 2-D process. This change can be explained via the use of FIG. 9. As illustrated in the figure the method generates a synthetic 3-D array that is focused on each imaged pixel. The representative process requires the calculation of the slant range from each array element to the imaged pixel, R(n,m), and the corresponding propagation phase for each frequency sample, (n,m,f). The propagation vector $e^{j(n,m,f)}$ is then formed, conjugated and as in:

$$s_r(n,m,f) = s_0(n,m,f) e^{-j(n,m,f)}$$

used to rotate the received signal to the desired reference phase. Now, the desired complex response R(x,y,z) is formed by completing the summation over the two array dimensions and the frequency band selected for the image. This is represented as:

$$R(x,y,z) = \sum_{1}^{N_f} \sum_{1}^{M} \sum_{1}^{N} s_r(n,m,f) e^{-j\phi(n,m,f)}.$$

This result is then envelope detected to represent the desired 3-D response for the imaged pixel. As is the case for the 2-D image, this process is repeated until all pixels in the imaged region have been evaluated.

As illustrated in FIG. 6, by adding this third dimension (third summation) the ambiguity region defined for the 2-D process is reduced to a single resolvable element with dimensions defined as for the 2-D result by the size of the processing region, the radar beamwidth, physical properties of the dielectric medium and the RF band that is included in the imaging calculation.

The present embodiment of the invention also permits the dielectric constant to vary on a pixel by pixel basis such that dielectric non-uniformity can be factored into the imaging process.

The processing method described above is the most flexible of the imaging sequences. It is however the most processing resource intensive. of those described. Its advantages include that it permits detailed treatment of physical dielectric property parameters such as frequency dependent propagation characteristics and it maintains processing efficiencies when a specific local region is to be imaged (as when it is not necessary to image the total subsurface region as defined by the ambiguous range of the radar and by the data "collection region"). Its ability to provide detailed treatment of these physical dielectric properties is unique to the frequency stepped radar and provides capabilities that cannot be satisfied by the short pulse (impulse) family of ground penetration radar (GPR) equipment. When it is desired to decrease the intensity of the processing load, the invention includes an approximation method utilizing the results of the Fast Fourier Transforms (FFTs) performed on the data.

The FFTed result includes the effect of phase rotating each frequency sample by the exact amount needed to produce the desired coherent summation at the propagation delay associated with the center of each FFT output coefficient. By use of this fact, the efficiency of the FFT can be used to expedite the processing. The preliminary processed data for each surface location, l, is the M-point FFT of the data set $$\{<I_1,Q_1>, \ldots <I_N,Q_N>, <0,0>, \ldots <0,0>\}.$$

This data set represents N frequency samples plus enough zero filling to complete the M-point data set. This zero filled array is then FFTed to produce an oversampled response in the time (or in this case slant range) dimension. The sample used for each of the L array element locations and each imaged pixel is formed by the linear interpolation between the centers of FFT coefficients which bracket the appropriate time delay $T_d(i)$ that is defined by the appropriate slant range between the imaged pixel and the specific array element when the dielectric properties of the intervening soil is considered. This linear interpolation yields the complex term $B_i e^{j i}$ that is to be included in the summation that spans the processed region. This summation $$R(x,y,z) = \frac{1}{L} \sum_{i=1}^{L} B_i e^{j\phi i}$$

where the summation is over all L synthetic array elements that form the "processed region", therefore forms the desired imaged element response.

The present invention can be implemented as a ground-based, ground-contact system. In this embodiment, the antennas are in close proximity to the surface of the ground. The direction of propagation of the radiated energy from the antennas is directly into the ground. Close proximity is typically within several feet of the surface. Data is recorded as it is gathered and processed to obtain 2-D and 3-D images.

The present invention can be implemented as a stand-off imaging system which operates at distances of, e.g., 1000 feet from the surface of the earth. According to this embodiment, the system hardware components operate in the same or similar manner as the ground-based system described above. The power output from the transmitter is prefereably raised to compensate for the losses of propagation through the air distance. The antenna configuration is constructed so as not to interfere with the operation of the flying vehicle (typically a heliocopter). Data is preferably recorded as it is gathered and processed to obtain the 2-D and 3-D images.

Imaging of explosive mines, geophysical phenomena, buried objects (utility lines, barrels or other containers holding contaminants such as PCB's or Carbon Tetrachloride, etc.) can also be accomplished with the radar system of the present invention.

The present invention can be used to image structures and their contents. In this application, the radar antenna beam can be directed toward a structure and scanned across in a linear manner. A 2-D image can then be constructed.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. A frequency-stepped radar imaging system for gathering data related to at least one characteristic of a subject area, comprising:

frequency generator means for generating a stepped-frequency synthetic radar image, said frequency generator further comprising a plurality of frequency synthesizer means, each capable of outputting a signal at a discrete frequency;

control means for alternately controlling each of said plurality of frequency synthesizer means so that said plurality of frequency synthesizer means alternately step through a series of discrete frequencies;

switching means for alternately selecting said signal output from each of said frequency synthesizer means as a local oscillator signal;

transmitter means for transmitting a radar signal related in frequency to said local oscillator signal;

reference receiver means for creating a reference signal related to said local oscillator signal;

transmission signal receiver means for receiving said radar signal transmitted by said transmitter means; and, means for extracting from said reference receiver means and said transmission receiver means said data related to said at least one characteristic of said subject area.

2. The frequency-stepped radar imaging system according to claim 1, wherein said data related to said at least one characteristic of said subject area comprises data indicating the presence or absence of a container holding hazardous waste.

3. The frequency-stepped radar imaging system according to claim 2, wherein said hazardous waste comprises carbon tetrachloride.

* * * * *